Nov. 8, 1949 A. BELCHETZ 2,487,039
PRODUCTION OF CARBON DISULFIDE
Filed Oct. 7, 1943 2 Sheets-Sheet 1

INVENTOR.
Arnold Belchetz
BY
ATTORNEY

Nov. 8, 1949     A. BELCHETZ     2,487,039

PRODUCTION OF CARBON DISULFIDE

Filed Oct. 7, 1943     2 Sheets-Sheet 2

INVENTOR.
Arnold Belchetz
BY
ATTORNEY

Patented Nov. 8, 1949

2,487,039

UNITED STATES PATENT OFFICE 2,487,039

PRODUCTION OF CARBON DISULFIDE

Arnold Belchetz, Larchmont, N. Y., assignor to Stauffer Chemical Company, a corporation of California Application October 7, 1943, Serial No. 505,335

15 Claims. (Cl. 23—206)

This invention relates to an improved process for the manufacture of carbon disulphide. This material is usually produced on a commercial basis from sulphur and carbon in retorts made of cast-iron and heated by some external source. These retorts are expensive to construct and inefficient in the utilization of heat. Since sulphur vapor in the temperature range above 600°–700° C. is intensively corrosive, retort maintenance and costs are also substantial. Raw materials costs are relatively high inasmuch as the usual carbon source is charcoal of a special grade. To insure good economy in operation, special hardwood charcoals are employed. Ordinary carbon and carbon sources cannot be utilized.

Other investigators have suggested other sources of carbon and sulphur. Thus it has been proposed to manufacture carbon disulphide utilizing hydrogen sulphide as a sulphur source and from sulphur with hydrocarbons, such as methane ethane, propane and butane as carbon sources. While these latter operations possibly admit of some simplification in the retort apparatus, because of the necessity for separating carbon disulphide from other gaseous constituents such as hydrogen sulphide or lower paraffin hydrocarbons, the recovery and purification equipment required for the carbon disulphide becomes quite complicated and expensive. So far as I am aware, none of these proposed processes has ever gone into commercial operation, and the old classic process of reacting the sulphur with heated carbon derived from charcoal still remains as the only substantial commercial source of carbon disulphide.

I have discovered that sulphur can be reacted with carbon if the carbon is supplied for reaction in finely divided solid form suspended either in the sulphur vapors or in an extraneous carrier gas stream. This manner of operation obviates the expensive massive retorts required for the classic process at the same time that it maintains many of the advantages of that process as compared with processes using other starting materials, including hydrogen sulphide and hydrocarbon gases. Further, by utilizing carbon in finely divided form it is possible to employ successfully any one of those cheap, plentiful carbons which cannot be employed in the retort process because they are either non-reactive or else react too slowly. These carbons, in finely divided form, become reactive.

In practicing the process of the present invention, sulphur is preferably supplied in the form of a vaporized stream of relatively pure sulphur. The finely divided particles of carbon are suspended in the sulphur vapor stream or in a suitable carrier gas stream which is then mixed with the stream of sulphur vapor. The sulphur-carbon stream is passed on into a reaction vessel after the sulphur and carbon have been raised to a sufficiently elevated temperature to react to form carbon disulphide. The reaction of carbon and sulphur to form carbon disulphide becomes slightly exothermic when the reactants have been heated to a reaction temperature of the order of 800° C. I have found that at this temperature the heat liberated is approximately 3000 calories per gram mol of carbon disulphide formed. This heat liberation is just sufficient to overcome radiation heat losses from a carefully insulated reactor, and it is thus still necessary to make provision to heat the reactants to the reaction temperature, despite the fact that an exothermic reaction is occurring.

The heating of the reactants can be achieved by passing them through heating zones thereby preheating them to any desired extent prior to their admission to the reaction zone. For example, I have successfully operated by first heating the sulphur vapor stream to about 450° to 500° C. and preheating the carbon-carrier gas mixture to a temperature of about 450° C. These streams are then mixed after which they are heated further to a temperature in the range desired. The preferred range is 650° C.–850° C., but the broader range is between 500° C. and 1100° C.

As a suitable carbon source, one can employ any suitable material such as powdered coke, an ordinary wood charcoal, or even a specially activated carbon. Any form of carbon can be used provided it has been heated to reduce the hydrogen and oxygen content to a sufficiently low value to ensure that the sulphur is economically used in the process. Preferably, the hydrogen and oxygen content should each be less than 1% by weight of the carbon. Utilizing activated carbon, and particularly when this form of carbon is in very finely divided form, of the order of 200–400 mesh particle size, one is able to secure a reaction rate which is comparatively high. This reaction rate can be used to advantage if one desires to simplify the apparatus. This will be discussed further.

It is known that the reaction rate between sulphur and carbon can be increased by using a catalyst such as iron sulphide. Catalysts for this reaction are well known to the art, some being described at length in the patent to de Simo, No. 2,187,383, and Patent No. 1,735,409 to Pier. If desired, a small quantity of a suitable catalyst can be introduced into the reaction zone in the carbon-gas stream. Iron is particularly convenient as a catalyst as it is the common impurity in many carbons; entering the system as an oxide, the iron is immediately reduced on contact with sulphur, being converted to an iron sulphide which then acts as a promoter for the reaction. In case it is desired to insure a definite improvement in the reaction rate, a determined quantity of the catalyst or a catalyst source can be added with the finely divided carbon. As a carrier-gas for the carbon, one can employ the sulphur vapor stream or any suitable gas, such as nitrogen, carbon dioxide, carbon monoxide, and even air. When an extraneous gas is used, the gas is ordinarily recycled and air can therefore be used since its oxygen content is quickly eliminated.

It is in general the broad object of this invention to provide an improved process for manufacture of carbon disulphide.

Another object is to provide a process enabling finely divided solid carbon to be employed as a reactant for manufacture of carbon disulphide.

The invention includes other objects and features of advantage, some of which will, together with the foregoing, appear hereinafter. The process of the present invention will become further apparent upon considering the following description of the preferred manner of practicing the process of this invention. In the drawing accompanying and forming a part of this specification, Figure 1 shows diagrammatically a suitable apparatus and flowsheet which can be employed.

Figure 1:
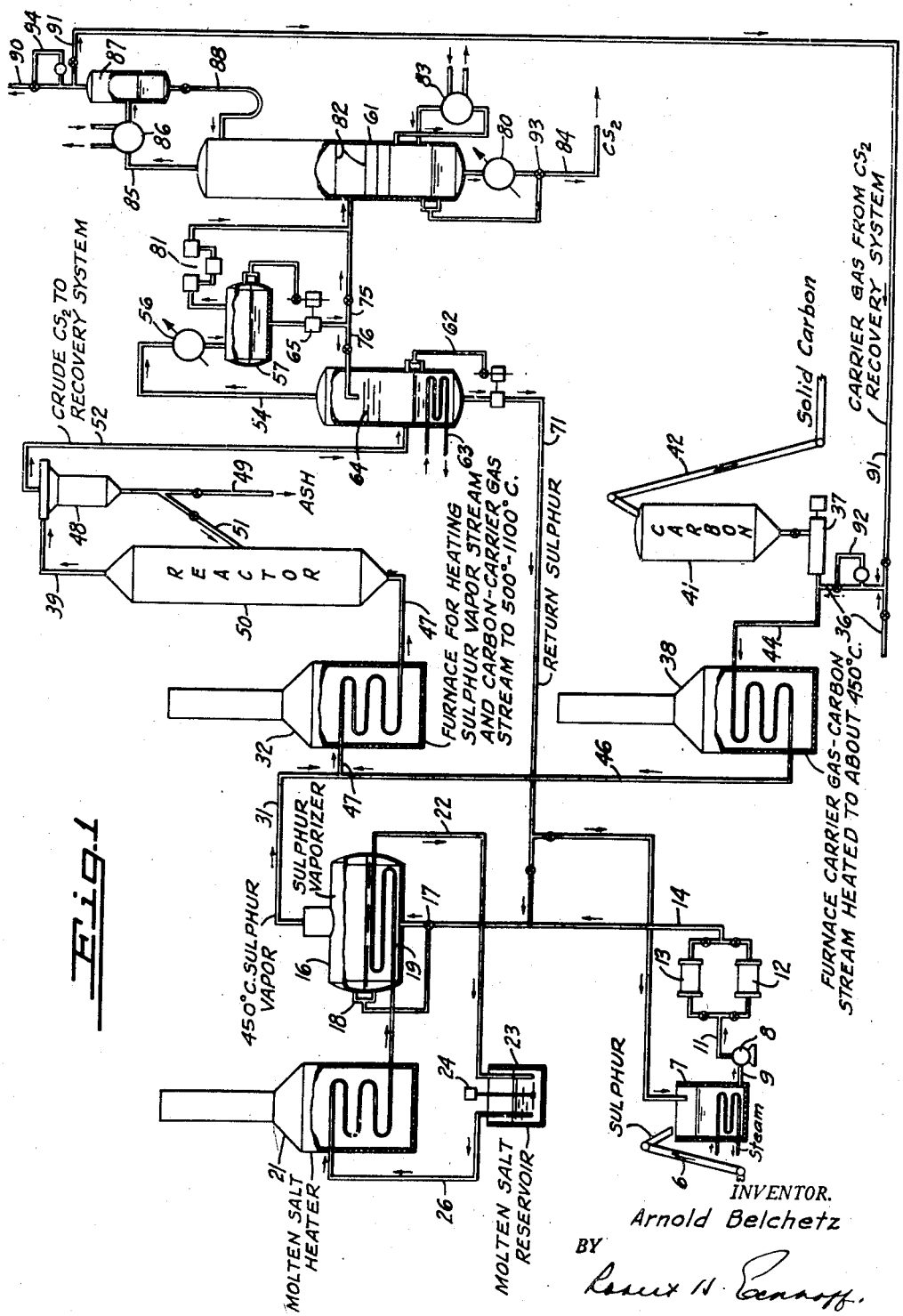

Referring particularly to Figure 1, solid sulphur is fed by conveyor 6 into a melting pot 7 from which molten sulphur is removed by pump 8 through the outlet 9. Pump 8 forces the molten sulphur through line 11 through two parallel filters 12 and 13 and then on through line 14 into a sulphur vaporizer 16. The lever of liquid sulphur in the vaporizer is maintained at a desired elevation above heating coil 19 by a liquid level control device indicated generally at 18 and which controls the flow of molten sulphur through valve 17 into the vaporizer 16. The heating coil 19 in the vaporizer 16 receives a suitable heating medium such as hot molten salt or a mixture of salts from a furnace 21. In the vaporizer 16 sulphur is vaporized at a temperature of about 450° C. The vaporizer coil 19 outlet is connected to a pipe 22 which leads to a salt pit 23 wherein the molten salt is collected. Salt to be heated and forced on through the sulphur vaporizer is withdrawn from the pit by a pump 24 and forced through line 26 which extends through the furnace 21 to the coil 19. In the vaporizer, the liquid sulphur is heated under moderate pressure to a vaporization temperature, usually about 450° C.

Powdered carbon is supplied to a suitable hopper or closed storage chamber 41 by a conveyor 42. The gas to be employed as carrier gas is introduced through a line 36 adjacent the outlet of a screw pump 37. This gas stream serves to convey the powdered material delivered from the hopper by the screw pump as a uniform suspension of the finely divided carbon in the carrier gas, in which the carbon concentration is about 3 pounds of carbon per cubic foot of conveying gas measured at the conveying temperature and pressure at the outlet of the screw pump. The quantity of conveying gas in regulated by the flow control mechanism 92. The carrier gas-carbon stream is passed on through line 44 into a furnace indicated generally at 38 wherein the gas-carbon stream is heated to a temperature of about 450° C. as it issues from the furnace in line 46 which conducts it to line 47 wherein it mixes with the sulphur vapor supplied from line 31 and passes on into and through furnace 32.

The concentration of finely divided carbon in the carrier gas of 3 pounds of carbon per cubic foot of gas is given by way of example and not by way of limitation; still higher concentrations can be employed for, as the gas is heated, this concentration decreases. Further, when the powdered carbon-carrier gas is mixed with the sulphur vapor, the concentration becomes even less so that the gases undergoing reaction contain only a very small weight of carbon per cubic foot of gas. It is, of course, essential that the gas velocities in the lines used for handling the carbon suspension be maintained at a suitable velocity. Both in the interconnecting lines and in the furnace tubes, a velocity of about 30 feet per second usually suffices.

Figure 2:
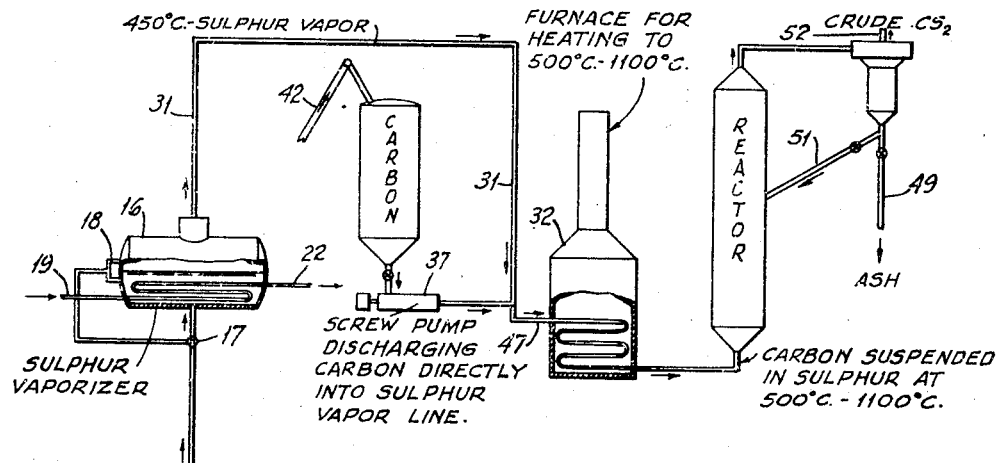
Figure 2 is a fragmentary diagrammatic view of an apparatus and flowsheet for suspending carbon in a stream of sulfur vapor; the apparatus shown is to be employed with the sulfur feed system and the carbon bisulphide recovery system of Figure 1.
Figure 2:
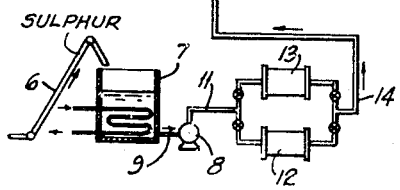

In the furnace 32 the mixed sulphur vapor-carrier gas-carbon mixture is heated to an elevated temperature in the reaction range desired, that is between 500° C. and 1100° C. With ordinary carbons, which are usually not particularly reactive, it is generally necessary to heat the mixture to a temperature of about 700°–850° C. and to then pass the gas stream on into a reactor 50. In case the carbon is delivered by the screw pump 37 directly into the sulphur vapor stream in line 31, as is shown in Figure 2, it is necessary that the sulphur be preheated to a sufficiently high temperature so that upon mixing with the carbon, no condensation of the sulphur will occur.

By the time the reactants enter reactor 50 they must have been supplied sufficient heat to enable them to react. However, it is necessary to permit them to remain in contact with one another for a short period of time. Reactor 50 generally consists of a heat insulated vertical vessel so designed that the upward superficial vapor velocity is of the order of ½ to 3 feet per second, and preferably between 1 and 1½ feet per second. Owing to the decrease in velocity in the reactor, any solids suspended in the gas fed to the reactor will tend to concentrate and form a highly turbulent bed in the lower portion of the reactor. The concentration of solids in this bed is relatively high, of the order of 15 pounds to 45 pounds per cubic foot. I prefer to keep it to some value of about 25 pounds per cubic foot but this depends upon the nature of the solid reacted, the quantity of ash introduced with the carbon and whether or not a catalyst is employed. Each of these variables affects the quantity and concentration of solids.

A vapor contact time in the reactor of the order of 40 seconds usually suffices; thus a gas velocity of 1½ feet per second and a reactor of 60 feet in height insures a vapor contact time of 40 seconds. The reactor should be of sufficient volume and dimensions to insure a vapor contact time of this order for the gaseous constituent.

The solids introduced into the reactor will remain there for a considerably longer period of time due to the higher concentration of solids in the reactor as compared with the concentration of solids in the gas introduced into the reactor. Eventually the reactor may become completely filled with unconverted solids such as ash and catalyst; these can be removed if necessary through a suitable outlet.

From the top of the reactor 50, the gases and suspended solids issue through line 39 into a cyclone separator 48. The solids collecting in the bottom of this separator are either removed through line 49 as ash or are returned to the reaction zone if their composition is such as to permit of their reuse; for example, they may contain a considerable quantity of catalyst, or may contain unconverted carbon when starting up.

The vapors leaving the cyclone 48 pass through line 52 into a sulphur separator indicated generally at 53. Uncondensed vapors pass through line 54 to a condenser 56 and thence into a reflux drum 57. Condensed liquid from the reflux drum is removed through a pump 65, a portion of the liquid being forced through line 76 to act as reflux in the sulphur separator 53 while the remaining liquid is forced through line 75 to a rectification column 61.

A body of molten sulphur is maintained in the bottom of the sulphur separator through utilization of liquid level control device 62 and a steam coil 63 is provided in the bottom of the separator to reboil separated sulphur to remove all traces of carbon disulphide and to maintain the sulphur in a molten condition. Several baffles 64 are also provided to effect the necessary fractionation of the unconverted sulphur from the lighter reaction products such as carbon disulphide.

The molten sulphur which condenses in the sulphur separator also contains any solids which escape from the cyclone 48 and it may therefore be desirable that this sulphur be returned to the melting pot 7 so that entrained solids can be removed in the filters 12 and 13 together with the solids introduced in the original sulphur feed. For this reason, line 71 is provided for the return of the molten sulphur to the melting pot, if it is desired, or directly into the molten sulphur line 14.

The condensed liquid from the reflux drum which is not used as reflux in the sulphur separator is discharged into the hydrogen sulphide stripper or rectification column 61. Any uncondensed vapors from the reflux drum are picked up by compressor 81 and are forced into the liquid stream in line 75, and thence on into the rectification column.

The rectification column 61 consists of a fractionating section with bubble trays 82 therein, and a steamheated reboiler 83. Sufficient heat is provided in the reboiler to expel any hydrogen sulphide from the carbon disulphide, which leaves the column 61 as a bottom product through cooler 80 and line 84. A level control mechanism 93 is provided to maintain a liquid level of carbon disulphide in the bottom of column 61. The uncondensed vapors leave the top of the column through line 85; these are cooled in condenser 86. The pressure on the system and the temperature to which the products leaving condenser 86 are cooled, are so regulated that substantial separation of carbon disulphide as a liquid occurs in the gas separator 87 connected to the condenser 86, the separated carbon disulphide being returned through line 88 to the top of the column 61. The uncondensed gas leaving the gas separator 87 is released through line 90 through a back pressure control mechanism 94 or is returned through line 91 to be utilized as a carrier gas for the carbon in line 44.

The process I have outlined is carried on very simply and expeditiously. The sulphur and carbon are fed substantially in the quantities required to carry out the reaction C+2S→CS$_2$. It is usually desirable, as is well known in the art, to supply an excess of sulphur, to the extent of about 10 to 15%. Only about 90% conversion of sulphur per pass can be conveniently secured. Higher conversions are secured at the lower temperatures; equilibrium data indicate that the best conversion of sulphur to CS$_2$ which can be attained at 823° C. is 93% and at 900° C., 90%. A balance has to be struck practically between the higher conversions secured at lower temperatures and the lowered reaction rates. A catalyst will, of course, assist in increasing the rate of reaction.

Figure 3:
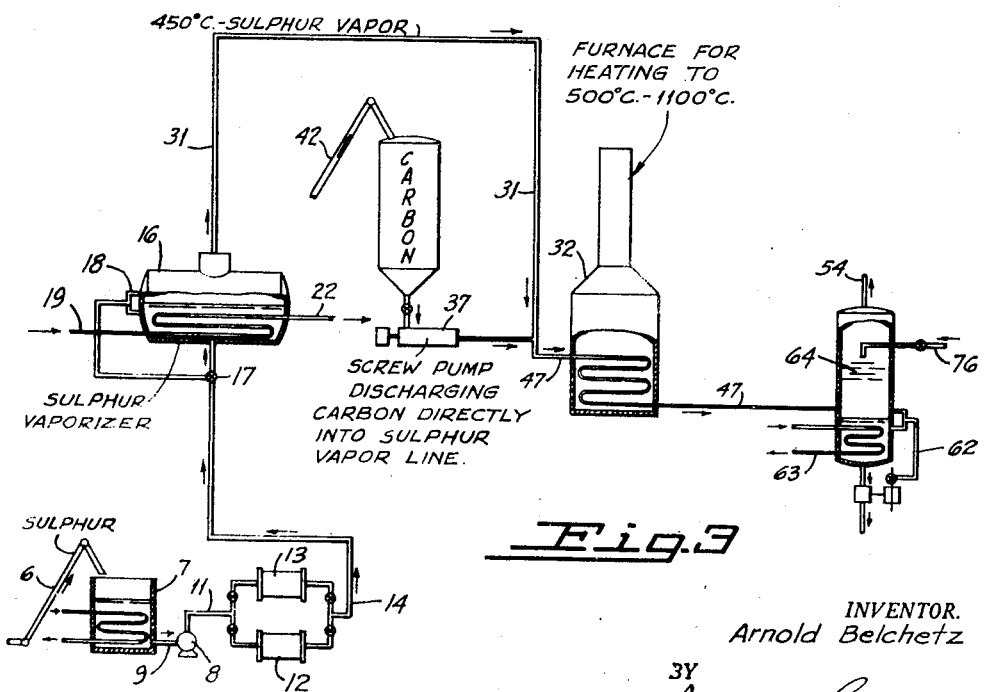
Figure 3 is another diagrammatic view of an apparatus and flowsheet for suspending the carbon in fluidized suspension in the sulfur vapor stream for conversion into carbon bisulphide.

In case a highly reactive form of carbon is employed it is not necessary that the reactor 50 be employed; instead the gases issuing from coil 47 and furnace 32 can pass directly to the sulfur separator 64, as appears in Figure 3. For the highly reactive form of carbon, the reaction will take place in much less time and it is not necessary to provide a separate reactor with a relatively long residence time for the highly heated sulphur and solid carbon to react, a portion of coil 47 serving as the reactor in this case.

The foregoing process is continuous and completely mechanized, thus possessing many advantages over the present retort process.

I claim:

1. A process for production of carbon disulphide comprising heating sulphur to vaporize it and form a stream of sulphur vapor, suspending carbon particles in an extraneous gas stream, mixing the gas stream and the sulphur stream to provide carbon and sulphur substantially in the proportions required for the reaction

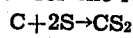
$$C+2S \rightarrow CS_2$$

supplying heat to the resulting mixed gas stream from a source extraneous to the stream to raise the temperature of the stream to between 500° C. and 1100° C. to form carbon disulphide, and recovering the carbon disulphide, said carbon particles being of a fineness whereat substantially all particles will pass a screen having 200 mesh per square inch.

2. A process for production of carbon disulphide comprising supplying heat thereto a substantially uniform gaseous suspension of solid carbon particles and vaporized sulphur from a source extraneous to the stream to raise said suspension to a temperature of between 500° C. and 1100° C. in a reaction zone, and maintaining said mixture in said zone for a period sufficient to form carbon disulphide, and recovering the carbon disulphide, the proportions of carbon and sulphur in the suspension being substantially those required for the reaction

$$C+2S \rightarrow CS_2$$

said carbon being sub-divided to an extent substantially sufficient to permit of its suspension in the gas stream in said reaction zone.

3. A process for production of carbon disulphide comprising forming a substantially uniform gaseous suspension of (a) vaporized sulphur, (b) solid carbon particles and (c) a catalyst for the reaction of carbon and sulphur to form carbon disulphide, supplying heat to said uniform suspension from a source extraneous to the suspension to raise said suspension to a temperature of between 500° C. and 1100° C. in a reaction zone, maintaining said mixture in said zone for a period sufficient to form carbon disulphide, and recovering the carbon disulphide, said suspension containing carbon and sulphur substantially in the proportions required for the reaction.

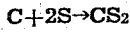

said carbon being sub-divided to an extent substantially sufficient to permit of its suspension in the gas stream in said reaction zone.

4. A process for the continuous production of carbon disulphide which comprises forming a gaseous mixture of sulphur vapor and a suspension of powdered carbon, said carbon being of such particle size that a majority thereof will pass a 200 mesh screen, supplying heat to said mixture from an extraneous source to raise the temperature thereof to between 500° C. and 1100° C., maintaining said heated mixture in a fluidized state in a reaction zone at a temperature between approximately 500° C. to 1100° C. for a time sufficient to form carbon disulphide, continually adding more carbon and vaporized sulphur, continually removing gaseous products from the reaction zone and recovering therefrom the carbon disulphide formed in said zone.

5. A process for the continuous production of carbon disulphide which comprises forming a mixture consisting of a suspension of powdered carbon in a stream of vaporized sulphur, said carbon being of such particle size that a majority will pass a 200 mesh screen, maintaining said mixture in a fluidized state in a reaction zone at a temperature between approximately 500° C. to 1100° C. for a time sufficient to form carbon disulphide, continually adding more carbon and vaporized sulphur, continually removing the gaseous products from the reaction zone and recovering carbon disulphide, and continually removing spent ash from said zone.

6. A process for the continuous production of carbon disulphide comprising vaporizing sulphur to provide a continuous stream of sulphur vapor, suspending finely divided carbon particles in a carrier stream of a gas substantially inert to sulphur and to the carbon, said carbon being of such particle size that a majority thereof will pass a 200 mesh screen, mixing the two streams to form a substantially uniform gaseous mixture thereof, heating the mixture to about 500° C. to 1100° C., introducing the heated mixture into a reaction zone wherein the mixture is maintained in a fluidized state at a temperature between approximately 500° C. to 1100° C. for a time sufficient to form carbon disulphide, continually removing gaseous products from the reaction zone, separating carbon disulphide from the gaseous products removed from the reaction zone to provide an exit stream of said carrier gas, and returning at least a portion of said exit stream as the aforementioned carrier stream of a gas.

7. A process for the continuous production of carbon disulphide comprising vaporizing sulphur to provide a continuous stream of sulphur vapor, heating said sulphur vapor stream to about 450° C., suspending finely divided carbon particles in a carrier stream of a gas substantially inert to sulphur and to the carbon, said carbon being of such particle size that a majority thereof will pass a 200 mesh screen, heating said carrier gas carbon containing stream to about 450° C., mixing the two streams to form a substantially uniform gaseous mixture thereof, heating the mixture to about 500° C. to 1100° C., introducing the heated mixture into a reaction zone wherein the mixture is maintained in a fluidized state at a temperature between approximately 500° C. to 1100° C. for a time sufficient to form carbon disulphide, continually removing gaseous products from the reaction zone, separating carbon disulphide from the gaseous products removed from the reaction zone to provide an exit stream of said carrier gas, and returning at least a portion of said exit stream as the aforementioned carrier stream of a gas.

8. A process for the continuous production of carbon disulphide comprising vaporizing sulphur to provide a continuous stream of sulphur vapor, introducing finely divided carbon into said sulphur vapor stream to form a suspension consisting of carbon in said sulphur vapor stream, said carbon being of such particle size that a majority thereof will pass a 200 mesh screen, heating the mixture to a temperature of 500° C. to 1100° C., then introducing the heated mixture into a reaction zone wherein the mixture is maintained in a fluidized state at a temperature between approximately 500° C. to 1100° C. for a time sufficient to form carbon disulphide, continually removing gaseous products from the reaction zone, and recovering carbon disulphide from such gaseous products.

9. A process for the continuous production of carbon disulphide comprising vaporizing sulphur to provide a continuous stream of sulphur vapor, heating the sulphur vapor stream to a temperature of about 450° C., introducing finely divided carbon into said heated sulphur vapor stream to form a suspension consisting of carbon in said heated sulphur vapor stream, said carbon being of such particle size that a majority thereof will pass a 200 mesh screen, heating the mixture to a temperature of 500° C. to 1100° C., then introducing the heated mixture into a reaction zone wherein the mixture is maintained in a fluidized state at a temperature between approximately 500° C. to 1100° C. for a time sufficient to form carbon disulphide, continually removing gaseous products from the reaction zone, and recovering carbon disulphide from such gaseous products.

10. A process for continuous formation of carbon disulphide comprising continually forming a substantially uniform gaseous suspension containing a mixture of powdered carbon and vaporized sulphur, said powdered carbon being of such particle size that a majority thereof will pass a 200 mesh screen, supplying heat to the suspension to raise the temperature of the suspension to between approximately 500° C. and 1100° C., then introducing the heated gaseous suspension into a reaction zone wherein said suspension is maintained at said temperature for a time sufficient to form carbon disulphide, continually removing gaseous products from the reaction zone, and recovering carbon disulphide from said gaseous products.

11. A process as in claim 10 wherein the suspension consists of sulphur and carbon.

12. A process as in claim 10 wherein the carbon is suspended in a carrier gas substantially inert to carbon and to sulphur.

13. A continuous process for producing carbon disulphide comprising vaporizing sulphur to provide a continuous stream thereof, heating said sulphur stream with heat from a source extraneous to the stream to a temperature in the range of 500° to 1100° C., mixing the heated sulphur stream with carbon of a size finer than 200 mesh to form a mixture consisting of carbon suspended in sulfur vapor, continuously introducing the so-formed mixture into a reaction zone and maintaining the mixture under fluidized conditions in the reaction zone at a temperature between 500° and 1100° C. whereat the sulphur reacts with carbon to form carbon disulphide for a time sufficient to form carbon disulphide, withdrawing reaction products from said zone and recovering carbon disulphide therefrom.

14. A process for continuous production of carbon disulfide in a reaction zone comprising forming a suspension outside of said reaction zone, said suspension consisting of powdered carbon in a stream of vaporized sulfur, said carbon being of such particle size that a majority will pass a 200 mesh screen, maintaining said carbon-sulfur suspension in a fluidized state in said reaction zone at a suitable reaction temperature and for a time sufficient to form carbon disulfide, continually adding more carbon in suspension in vaporized sulfur to said reaction zone, continually removing gaseous products from the reaction zone and recovering carbon disulfide.

15. A continuous process for producing carbon disulfide by reacting carbon and sulfur in a reaction zone comprising vaporizing sulfur to provide a continuous stream thereof, heating said sulfur stream outside of said reaction zone and with heat from a source extraneous to the stream to a temperature in the range of 500° to 1100° C., mixing the heated sulfur stream with carbon of a size finer than 200 mesh to form a suspension consisting of carbon in the heated sulfur vapor, maintaining the suspension under fluidized conditions in said reaction zone (1) at a temperature between 500° and 1100° C. and whereat the sulfur will react with carbon to form carbon disulfide and (2) for a time sufficient to form carbon disulfide, withdrawing reaction products from said zone and recovering carbon disulfide therefrom.

ARNOLD BELCHETZ.

REFERENCES CITED

The following references are of record in the file of this patent:

UNITED STATES PATENTS

| Number | Name | Date |
|---|---|---|
| 1,511,875 | Edgar | Oct. 14, 1924 |
| 1,810,055 | Muller et al. | June 6, 1931 |
| 1,984,380 | Odell | Dec. 18, 1934 |
| 1,992,832 | Mootz | Feb. 26, 1935 |
| 2,026,840 | Leahy | Jan. 7, 1936 |
| 2,052,297 | Iddings | Aug. 25, 1936 |
| 2,107,264 | Baxter | Feb. 1, 1938 |
| 2,141,758 | Merriam | Dec. 27, 1938 |
| 2,289,329 | Prickett | July 7, 1942 |
| 2,345,487 | Liedholm | Mar. 28, 1944 |
| 2,443,854 | Ferguson | Jan. 22, 1948 |